(12) United States Patent
Lee

(10) Patent No.: US 6,685,060 B1
(45) Date of Patent: Feb. 3, 2004

(54) MATERIAL HANDLING APPARATUS

(75) Inventor: Charles Lee, Shipston-on-Stour (GB)

(73) Assignee: Matcon (R&D) Limited, Gloucestershire (GB)

(*) Notice: Subject to any disclaimer, the term of this patent is extended or adjusted under 35 U.S.C. 154(b) by 0 days.

(21) Appl. No.: 09/763,454

(22) PCT Filed: Aug. 13, 1999

(86) PCT No.: PCT/GB99/02688

§ 371 (c)(1),
(2), (4) Date: Jul. 26, 2001

(87) PCT Pub. No.: WO00/10893

PCT Pub. Date: Mar. 2, 2000

(30) Foreign Application Priority Data

Aug. 25, 1998 (GB) .......................... 98 18 536

(51) Int. Cl.⁷ .......................... B65D 83/06; B65D 90/66
(52) U.S. Cl. .................... 222/148; 222/185.1; 222/199; 222/334; 222/504; 222/564
(58) Field of Search .............................. 222/148, 181.1, 222/185.1, 333, 334, 409, 460, 462, 199, 477, 507, 504, 559, 564; 141/312, 346; 277/501, 542

(56) References Cited

U.S. PATENT DOCUMENTS

| | | | | |
|---|---|---|---|---|
| 862,867 A | * | 8/1907 | Eggleston | ............ 417/390 |
| 4,470,524 A | * | 9/1984 | Semenenko | ............ 222/196 |
| 5,351,864 A | * | 10/1994 | Semenenko et al. | ........ 222/504 |
| 5,582,332 A | * | 12/1996 | Kiefer et al. | ............ 222/504 |
| 5,743,439 A | * | 4/1998 | Semenenko | ............ 222/185.1 |
| 5,775,544 A | * | 7/1998 | Semenenko | ............ 222/181.1 |

* cited by examiner

*Primary Examiner*—Gene Mancene
*Assistant Examiner*—Patrick Buechner
(74) *Attorney, Agent, or Firm*—Miles & Stockbridge P.C.

(57) ABSTRACT

Material handling apparatus for gravity discharge of flowable particulate material through an outlet (2) of a container (3) (shown dashed) for such material which outlet (2) is normally obturated by a hollow cone valve member (4), the apparatus (1) comprising actuator means (5) having a flat surface (6) and being adapted to engage the cone valve member (2) adjacent the base (7) thereof for raising and lowering same whereby to provide that the interior volume of the cone valve member (4) remains substantially empty. In the embodiment, the apparatus (1) is a component of a materials handling system in the form of a discharge station "D", which is fixed for example in the floor of a facility for transferring flowable material from a (transportable) IBC (3) to a process "P" such as mixing, blending, tableting the like which is below the discharge station D.

36 Claims, 2 Drawing Sheets

MATERIAL HANDLING APPARATUS

The invention relates to material handling apparatus, particularly to such apparatus as is used for gravity discharge of flowable particulate material through an outlet of a container for such material, which outlet is normally obturated by a hollow cone valve member.

It will be understood that the expression flowable particulate material includes granules, particles of material, powders, pellets, slurries, cake, nuts and the like which are flowable under gravity through a container outlet. The "greening" of the environment in general, and the requirements of hygiene and good practice demand the transfer of such materials without ambient contamination. With the FDA (US Food and Drug Administration) becoming increasingly involved in the manufacture of bulk pharmaceuticals and fine chemicals for subsequent use in finished pharmaceutical, food and oral hygiene products, the requirement to introduce and follow GMP (Good Manufacturing Practices) enabling process steps to be validated, is now of paramount importance.

This requirement also relates to inter-process activities, the movement of materials from one process to another.

Due to the batch processes involved the handling of Bulk Solids to the bulk pharmaceutical industry usually means the transfer of batches of 1000 kg or less from one process to another.

Methods of transfer employed by other industries (e.g. mechanical or pneumatic conveying) cannot usually be considered because requirements for cleaning, batch integrity, hygiene and containment cannot be met. Also the difficulties in handling generally poorly flowing, cohesive solids present a problem.

Therefore, traditionally the bulk pharmaceutical industry has used drums, kegs or big bags as the means of transferring batches of solids from process to process.

This is very labour intensive and requires an operator to be "suited up" when handling potent or toxic products. More importantly, it is also totally "operator reliant" on the batch being transferred to the process and not spilt on the floor. This method cannot be considered good G.M.P. and cannot provide batch traceability. Also open transfers to and from kegs will not comply with international regulations governing dust control.

Rigid stainless steel Intermediate Bulk Containers or IBC's have been used successfully for many years in the secondary pharmaceutical industry for inter-process batch transfer. However, their introduction into the process chain has historically followed the granulation process where the powders are free flowing and create few problems of discharge from the IBC.

In the past when these traditional IBC's, usually fitted with butterfly valves at their outlet, have been introduced into bulk or primary pharmaceutical production, they have generally failed consistently to discharge the more difficult flowing, cohesive solids found in this industry.

It is an object of this invention to seek to obviate these disadvantages.

According to a first aspect of the invention there is provided material handling apparatus for gravity discharge of flowable particulate material through an outlet of a container for such material which outlet is normally obturated by a hollow cone valve member, and actuator means adapted to engage the cone valve member adjacent the base thereof for raising and lowering same, characterised in that the actuator means comprises an end plate member adapted such that upon engagement with the cone valve member, the interior volume of the cone member remains substantially empty.

Using the invention it is possible to provide a relatively simple low profile apparatus.

The end plate member may be substantially planar. This provides a relatively simply manufacturable member.

The end plate member may extend substantially orthogonally to the raising and lowering direction. This provides for positive lifting and lowering in use.

The end plate member may have a peripheral skirt which extends in the raising and lowering direction. This provides for in use, mating with a cylindrical depending skirt of the cone valve member.

The skirt may terminate in an out-turned lip. This provides a rest for the cone valve member.

The end plate member may be secured to a support member carried by the actuator means. This obviates canting of the support, particularly where the end plate member may be secured to the support member by an interference fit, or alternatively the end plate member may be secured to the support member by securing means, for example bolts.

The end plate member may comprise plastic. This provides for ease of manufacture, and cleaning.

The actuator means may comprise a bellows means. This provides for a positive raising and lowering action. The actuator means may further comprise a piston and cylinder means.

This provides both an initial lift, and a guidance means.

The end plate member may include a device adapted for positive interengagement with a cone valve member. This provides for a seal to be made before discharge.

The device may comprise an inflatable ring member. This provides for positive interengagement particularly when the ring is a pneumatic ring.

There may be means to clean at least part of the interior of the apparatus. This is an advantageous system for ensuring G.M.P.

The cleaning means may comprise air wash means, water wash means, or a combined air and water wash means.

Where there is a combined air and water wash means they may be operable independently or sequentially. All these options provide versatility.

According to a second aspect of the invention there is provided a materials handling system, comprising apparatus as hereinbefore defined and a transportable container for material, adapted for mounting on the apparatus.

Material handling apparatus embodying the invention is hereinafter described, by way of example, with reference to the accompanying drawings.

Figure 1:
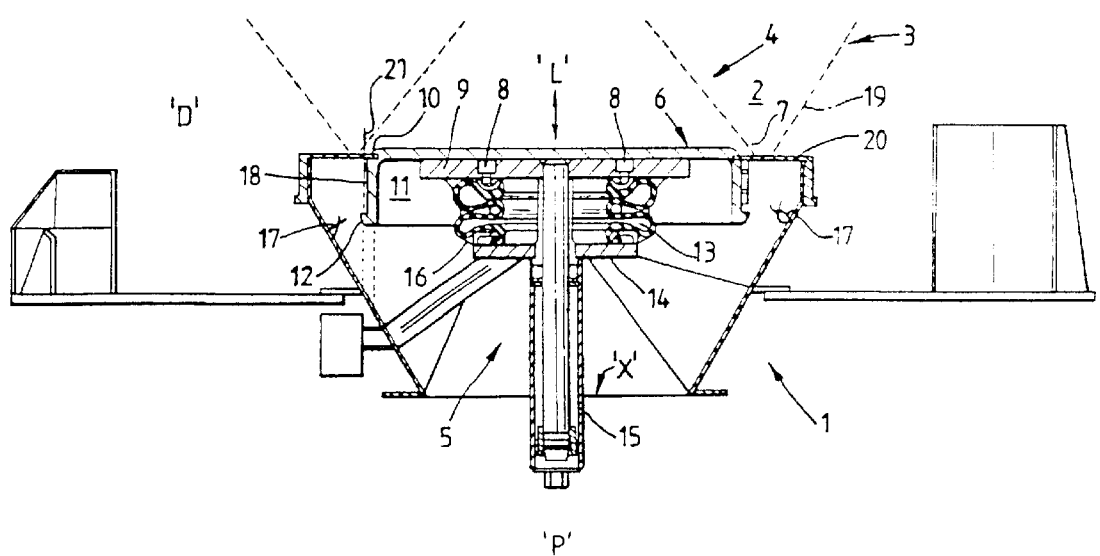
FIG. 1 shows a schematic side elevational view of one embodiment of apparatus according to the invention, prior to docking of an IBC.

Referring to the drawings in which like parts are indicated by like numerals, there is shown material handling apparatus 1 for gravity discharge of flowable particulate material through an outlet 2 of a container 3 (shown dashed) for such material which outlet 2 is normally obturated by a hollow cone valve member 4, the apparatus 1 comprising actuator means 5 having a flat surface 6 and being adapted to engage the cone valve member 2 adjacent the base 7 thereof for raising and lowering same whereby to provide that the interior volume of the cone valve member 4 remains substantially empty.

In the embodiment, the apparatus 1 is a component of a materials handling system in the form of a discharge station 'D', which is fixed for example in the floor of a facility for transferring flowable material from a (transportable) IBC 3 to a process 'P' such as mixing, blending, tableting or the like which is below the discharge station D.

The IBC 3 is usually positioned above the apparatus 1, or discharge station D, by a stacker truck, overhead hoist, fork-lift truck or the like. However, in apparatus 1 as shown in the drawing and embodying the invention, the support 6 as is shown is planar, forms an end plate of the actuator means 5 and engages the cone valve in use at or adjacent the base 7 thereof thus leaving substantially the whole interior volume of the cone valve 4 empty. Stated in another way, the plate member 6 which is generally planar and extends orthogonally to the raising and lowering direction 'L', provides a low profile apparatus or apparatus of relatively low height, thereby providing that an operator can use a hand-held or operated pallet truck. This also has the advantages of low cost, versatility and maneuverability so that the apparatus 1 whilst conforming to G.M.P. is relatively simple yet efficient.

As shown, the end plate member 6 is secured as by bolts 8 to a support 9 of the actuator means 5, the end plate member 6 and the support 9 therefore being circular in plan. The end plate member 6 is moulded from plastic, and in the embodiment has a curved periphery 10 which leads to a depending cylindrical skirt 11 which terminates in an outturned lip 12.

The actuator means 5 comprises a bellows means 13 which is pneumatically operated and extends between the support 9 and a substantially parallel, and lower in use, plate 14 through which extends guide means in the form of a rod and guide tube arrangement 15 which is part of actuator means 5, there being a shroud 16 which encases the bellows means 13 to prevent retention of material in the folds of the bellows and which provides for ease of cleaning in place by cleaning means in the form of nozzles 17 which may be air wash nozzles, water wash nozzles, or a combination of air and water wash nozzles all of which nozzles are directed interiorly of the apparatus 1 for cleaning the interior thereof, it being understood that the nozzles 17 are connected to suitable sources of cleaning air and/or water externally of the apparatus.

Where the nozzles 17 are combined air and water wash nozzles, they are preferably operated as desired independently to provide either a water wash or an air wash. This independent operation may be sequential.

The end plate member 6 also in the embodiment includes securing means 18 by which it is interengageable with a cone valve member 4 as described hereinafter, the securing means 18 being an pneumatically inflatable toroidal ring or tyre.

Figure 2:
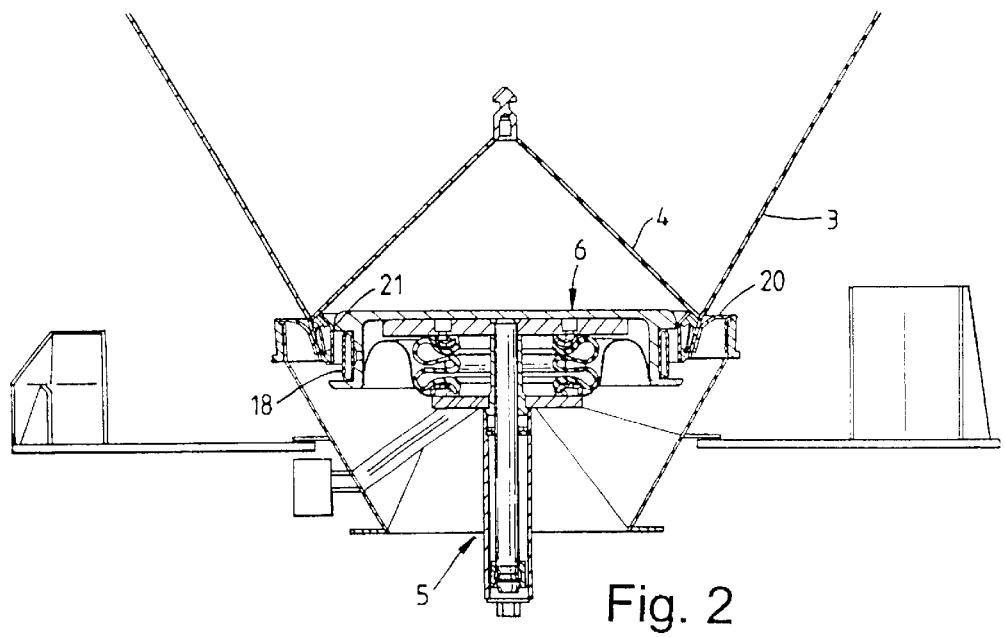
FIG. 2 shows a view similar to FIG. 1, with an IBC 'docked'.

In operation, the actuator means 5 is in the lowered or inoperative position shown. An IBC 3 from which flowable material is to be transferred is transported on a hand operated pallet truck (which could also be automatically or remotely operated), and is set down on the apparatus 1, an outlet hopper 19 the IBC engaging a flexible, resilient process lip seal 20 of the apparatus 1. When the IBC 3 is docked with the apparatus 1, the lip seal 20 flexes downwardly as viewed (FIG. 2), and the bellows means 13 is operated so that the member 6 engages the base of the cone valve, interiorly of the cone valve 4. The inflatable interengageable means 18 is then inflated to expand and lock securely against the inside of a depending cylinder 21 of the valve 4, which cylinder is supported on the lip 12. Thus the top of the apparatus 1 is totally sealed to the interior surfaces of the cone valve member 4 of the IBC 3, thereby ensuring that the bottom of the cone valve member and the top of the apparatus are sealed together during transfer of material, so that when the IBC is eventually removed after transfer, the contacting surfaces are clean.

The cone valve member 4 is at this point still seated on the interior of the hopper outlet 3 of the IBC, thereby obturating same. The bellows means 13 is now actuated to raise the cone valve member 4 to provide an annular gap between the base of the cone and the interior of the hopper outlet, through which the desired amount of material flows in the direction 'X', to the process 'P'. When the desired amount of material has been transferred, the bellows means 13 is deflated to lower the cone valve member 4 and close the outlet. The inflatable ring 18 is deflated, and then the bellows means so that the plate is clear of the IBC which can be removed. The apparatus 1 is thus ready for another operation.

The guide means 15 guides the raising and lowering operations.

The actuator means 5 can provide a variable lift, a straight lift, or a pulsing action as desired, such options being provided by suitable control of the bellows means and/or the piston and cylinder arrangement.

Also the cone valve 4 of the IBC may be a moulded plastic member having external fins or wings to assist flow.

It will be understood that variations are possible. For example, the guide means 15 instead of comprising a rod and guide tube may comprise a piston and cylinder, particularly where a double lip seal is included. By double lip seal is meant two annular flexible, resilient seals which are spaced apart and substantially parallel and which at their inner peripheries contact part of the apparatus and flex on movement thereof to allow that movement whilst maintaining a sealing action.

Figure 3:
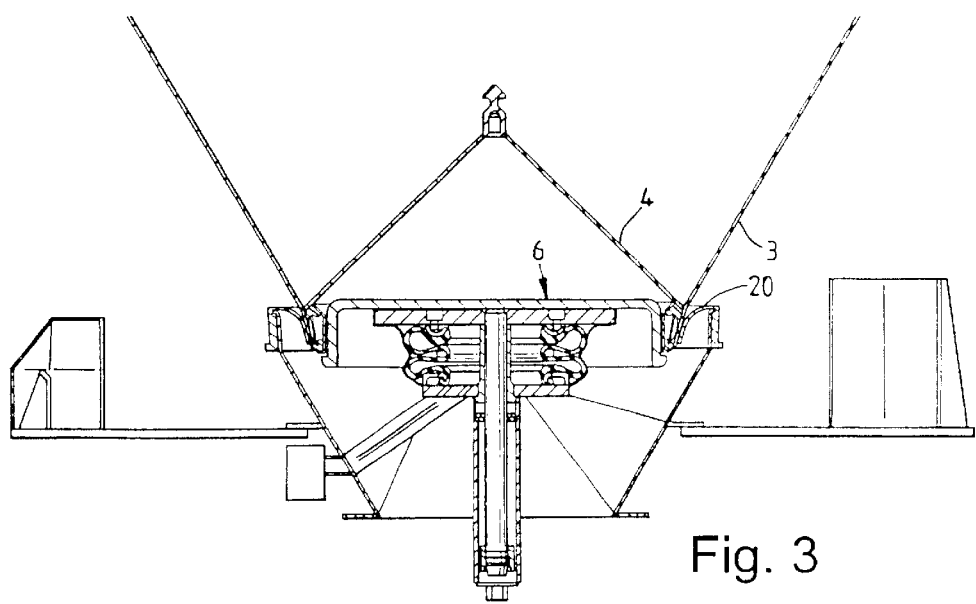
FIG. 3 shows a view similar to FIG. 2, of an embodiment which omits an inflatable seal ring.

The securing means 18 could also be passive, for example a lip seal with a vacuum applied above, or alternatively and with preference, the combination of an inflatable ring 18 with an applied vacuum which "pulls" the support 6 down, the vacuum being applied by means not shown which apply the vacuum to the support 6 thereabove, below the cone valve 4. Moreover, the combination of a vacuum with the ring 18 and lip 12 provide a means of levelling the cone 4 so that it is always "square" with respect to the means 5, and outlet. The rod and guide tube could include a biassing means such as a spring return to provide positive shutting of the cone valve in combination with the lip seal and vacuum or with an inflatable seal 18. There may also be means to level and/or clamp the cone valve. Moreover, the securing means 18 per se could be omitted (FIG. 3) without detriment to the operation of any of the embodiments described.

What is claimed is:

1. Material handling apparatus for gravity discharge of flowable particulate material through an outlet of a container of such material which outlet is normally obturated by a hollow cone valve member, and actuator means (5) adapted to engage the cone valve member (4) adjacent the base (7) thereof for raising and lowering same, characterized in that the actuator means (5) comprises an end plate member (6) adapted such that upon engagement with the cone valve member, the interior volume of the cone member (4) remains substantially empty, said apparatus further comprising means adapted to level the cone valve member.

2. Apparatus according to claim 1, characterised by the end plate member (6) comprising plastic.

3. Apparatus according to claim 1, characterised by the means comprising a vacuum leveling means.

4. A material handling system, characterised by apparatus (11) according to claim 1 and a transportable container for material (31), adapted for mounting on the apparatus (1).

5. Apparatus according to claim 1, characterised by the actuator means (5) comprising bellows means (13).

6. Apparatus according to claim 5, characterised by the actuator means (5) further comprising a piston and cylinder means (15).

7. Apparatus according to claim 1, characterised by the end plate member (6) including a device (18) adapted for positive interengagement with a cone valve member.

8. Apparatus according to claim 7, characterised by the device (18) comprising an inflatable ring member.

9. Apparatus according to claim 8, characterised by the device (18) comprising a passive seat device.

10. Apparatus according to claim 1, characterised by means (17) to clean at least part of the interior thereof.

11. Apparatus according to claim 10, characterised by the cleaning means (17) comprising air wash means.

12. Apparatus according to claim 10, characterised by the cleaning means (17) comprising water wash means.

13. Apparatus according to claim 10, characterised by the cleaning means (17) comprising combined air and water wash means.

14. Apparatus according to claim 13, characterised by the air and water wash means being operable independently.

15. Apparatus according to claim 14, characterised by the air and water wash means being operable sequentially.

16. Apparatus according to claim 1, characterised by the end plate member (6) being substantially planar.

17. Apparatus according to claim 16, characterised by the end plate member (6) extending substantially orthogonally to the raising and lowering direction (L).

18. Apparatus according to claim 17, characterised by the end plate member (6) having a peripheral skirt (11) which extends in the raising and lowering direction (L).

19. Apparatus according to claim 18, characterised by the skirt (11) terminating in an out-turned lip (12).

20. Apparatus according to claim 19, characterized by the end plate member (6) being secured to a support member (9) carried by the actuator means (5).

21. Apparatus according to claim 20, characterized by the end plate member (6) being secured to the support member (9) by an interference fit.

22. Apparatus according to claim 20, characterised by the end plate member (6) being secured to the support member by securing means (8).

23. Apparatus according to claim 20, characterized by the actuator means (5) comprising biasing means to provide positive shutting of the cone valve member.

24. Apparatus according to claim 23, characterized by the biasing means comprising a spring return.

25. Material handling apparatus for gravity discharge of flowable particulate material through an outlet of a container of such material, which outlet is normally obturated by a hollow cone valve member, and an actuator device (5) adapted to engage the cone valve member (4) adjacent the base (7) thereof for raising and lowering same, characterized in that the actuator device (5) comprises an end plate member (6) adapted such that, upon engagement with the cone valve member, the interior volume of the cone valve member remains substantially empty, said apparatus further comprising a cone valve member leveling device.

26. Apparatus according to claim 25, wherein the end plate member (6) is secured to a support member carried by the actuator device (5), and wherein the end plate member is secured to the support member by securing elements (8).

27. Apparatus according to claim 25, wherein the cone valve member leveling device comprises a vacuum leveling element.

28. A material handling system, comprising an apparatus according to claim 25 and a transportable container for material (31), adapted for mounting on the apparatus.

29. Apparatus according to claim 25, wherein the actuator device (5) comprises a biasing element to provide positive shutting of the cone valve member.

30. Apparatus according to claim 29, wherein the biasing element comprises a spring return.

31. Apparatus according to claim 25, wherein said actuator device (5) comprises a bellows device (13).

32. Apparatus according to claim 31, wherein the actuator device (5) further comprises a piston and a cylinder.

33. Apparatus according to claim 25, further comprising an interior cleaning element adapted to clean at least part of an interior of said apparatus.

34. Apparatus according to claim 33, wherein the cleaning element comprises an air wash element.

35. Apparatus according to claim 33, wherein the cleaning element comprises a water wash element.

36. Apparatus according to claim 33, wherein the cleaning element comprises a combined air and water wash element, and wherein an air wash element and a water wash element of said combined wash element are capable of operating either independently or sequentially.

* * * * *